United States Patent
Hua et al.

(10) Patent No.: US 7,142,240 B1
(45) Date of Patent: Nov. 28, 2006

(54) ACTIVE PIXEL SENSOR ARRAY RESET

(75) Inventors: Paul Hua, Neapean (CA); Peter Hauderowicz, Ottawa (CA)

(73) Assignee: Psion Teklogix Systems, Inc. (CA)

( * ) Notice: Subject to any disclaimer, the term of this patent is extended or adjusted under 35 U.S.C. 154(b) by 576 days.

(21) Appl. No.: 09/617,564

(22) Filed: Jul. 17, 2000

(51) Int. Cl.
  *H04N 3/14* (2006.01)
  *H04N 5/335* (2006.01)

(52) U.S. Cl. .................... 348/302; 348/308; 250/208.1

(58) Field of Classification Search ................ 348/302, 348/308, 313, 230.1, 294; 250/208.1; 257/258; 358/906, 909.1
See application file for complete search history.

(56) References Cited

U.S. PATENT DOCUMENTS

| | | | | |
|---|---|---|---|---|
| 4,609,825 A | * | 9/1986 | Berger et al. | 348/324 |
| 4,827,348 A | * | 5/1989 | Ernest et al. | 348/221.1 |
| 5,262,871 A | * | 11/1993 | Wilder et al. | 348/307 |
| 5,452,004 A | * | 9/1995 | Roberts | 348/301 |
| 5,572,257 A | * | 11/1996 | Conrads et al. | 348/308 |
| 5,585,814 A | * | 12/1996 | Ueno et al. | 345/90 |
| 5,881,184 A | * | 3/1999 | Guidash | 382/321 |
| 6,175,383 B1 | * | 1/2001 | Yadid-Pecht et al. | 348/302 |
| 6,549,234 B1 | * | 4/2003 | Lee | 348/302 |
| 6,603,513 B1 | * | 8/2003 | Berezin | 348/308 |

FOREIGN PATENT DOCUMENTS

| | | |
|---|---|---|
| EP | 0 809 300 A2 | 11/1997 |
| WO | WO 9314595 A1 * | 7/1993 |
| WO | WO 99/53683 | 10/1999 |

* cited by examiner

*Primary Examiner*—Vivek Srivastava
*Assistant Examiner*—Yogesh Aggarwal
(74) *Attorney, Agent, or Firm*—Hayes Soloway P.C.

(57) ABSTRACT

The method and apparatus for resetting an Active Pixel Sensor (APS) array comprises a controller for sequentially pre-resetting groups of one or more sensors in the array and then simultaneously resetting all of the sensors. The groups may be formed from one or more adjacent or non-adjacent individual sensors, rows or columns of sensors. The apparatus may further include a detector for sensing the bias voltage present on the array substrate in order for the controller to determine the number of sensors in the groups being reset. This method and apparatus assure that current flow is kept at a fairly steady level to avoid large variations in current flow that may disrupt other functioning circuits on the substrate including latch-up.

12 Claims, 4 Drawing Sheets

ACTIVE PIXEL SENSOR ARRAY RESET

FIELD OF THE INVENTION

The invention relates generally to image sensing circuits, and more particularly to the resetting of active pixel sensor arrays.

BACKGROUND OF THE INVENTION

CMOS image sensor arrays can employ several types of pixels. Passive pixel sensor cells are comprised of a simple photodiode and an access transistor. Active pixel sensor (APS) cells have added features including a reset transistor and a source follower amplifier.

A conventional APS sensing array is composed of individual light sensitive transducers called pixels that are organized in rows and columns. One typical pixel arrangement is composed of a photodiode (with junction capacitance), a reset transistor with a reset gate, an amplifier transistor, and a row select transistor.

During the reset cycle, charge is transferred onto the capacitive element through the reset transistor. An integration cycle allows charge from the capacitive element to be discharged through the photodiode. The remaining charge is then sampled by the amplifying gate and transferred to column amplifiers through the row select transistor. Upon completion of this cycle, the capacitive element in the array must be reset via the reset transistor. At this moment, a substantial amount of charge can be driven onto the substrate, raising the substrate bias voltage. Since the substrate is common for both the sensor array and peripheral circuitry, a significant increase in substrate charge increases the substrate bias voltage, which in turn can cause a circuit malfunction referred to as latch-up.

Latch-up is defined as the generation of a low-impedance path in CMOS devices between the power supply rail and the ground rail. It is a well known fact that, under certain conditions, a parasitic PNPN junction can be created in a CMOS integrated circuit, resulting in the latch-up and possibly destruction of the CMOS integrated circuit.

Latch-up is a parasitic conduction mechanism to which CMOS structures have an inherent vulnerability. It is a thyristor operating mechanism that can be triggered in PNPN structures. If any such PNPN structure is triggered into latch-up on a chip, large currents can flow and the results are usually irreversibly catastrophic for the entire chip.

Traditionally, integrated circuit designers have often relied on the fact that, typically, the operating characteristics of a CMOS integrated circuit are insufficient to surpass the high current threshold for triggering a latch-up. The potential problem is evaded by placing many substrate connections around the circuit. The substrate connections can draw off any potential current overload and prevent the latch-up triggering. However, in imaging circuitry, the fill factor, or percentage of the total pixel real estate that is effectively photosensitive, is significantly reduced if substrate connections were to be integrated within the cell. It is therefore impractical to place substrate connections within the array. In conventional APS imaging arrays the array size and the amount of charge being discharged upon reset is insufficient to cause latch-up, but due to the increasing size of sensor arrays, (1.3 Mpixels), the charge increase must be considered.

Several methods are used to prevent circuit latch-up, including well definition and the reduction of the lateral resistance of the n-tub. Well definition can effectively prevent PNPN junction formation particularly for small circuits; however, the amount of charge related to an array reset can be too great for sufficient latch-up prevention using the well definition method. Since the presence of large lateral resistance in the n-tubs has been found to cause latch-up, it was felt that the reduction of lateral resistance may prevent latch-up. Although this method is proven to be effective, it cannot handle large currents. Additionally, a change in the process for semiconductor substrates also increases costs, which should be minimized for production.

U.S. Pat. No. 5,881,184 which was issued on Mar. 9, 1999, describes a pixel for an imager in which the reset transistor either has two functions or is replaced by two reset transistors. In the latter case, the only way that the pixel can be reset is if a reset signal is applied to the gates of both of the transistors. The advantage of this is that each pixel can be reset individually rather then having all of the pixels in a row reset at the same time. This reference does not address the problem of the occurrence of latch-up during pixel resetting.

Therefore, there is a need for a method and apparatus for safely resetting active pixel sensor arrays without a significant increase in current that may cause destructive latch-up.

SUMMARY OF THE INVENTION

The invention is directed to a method and apparatus resetting an array of active pixel sensors (APS) arranged in rows and columns on a substrate.

In accordance with one aspect of this invention, the resetting process comprises the sequential pre-resetting of groups of one or more sensors in the array and then simultaneously resetting all of the sensors. The groups may be formed from one or more adjacent or non-adjacent individual sensors, rows or columns of sensors. The process may further include the step of detecting the bias voltage present on the array substrate to determine the number of sensors in the groups being pre-reset.

In accordance with another aspect of this invention, the apparatus for resetting the array of active pixel sensors which are arranged in rows and columns comprises a controller which is coupled to the sensor array for applying signals to the array for sequentially pre-resetting groups of one or more sensors in the array and then for simultaneously applying a signal to all of the sensors in the sensor array for resetting the entire array. The apparatus may further include a detector for sensing the bias voltage of the sensor array substrate for the controller to determine the number of sensors in each group being pre-reset. The groups of sensors being pre-reset may include one or more adjacent or non-adjacent individual sensors or rows or columns of sensors.

Other aspects and advantages of the invention, as well as the structure and operation of its various embodiments, will become apparent to those ordinarily skilled in the art upon review of the following description in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
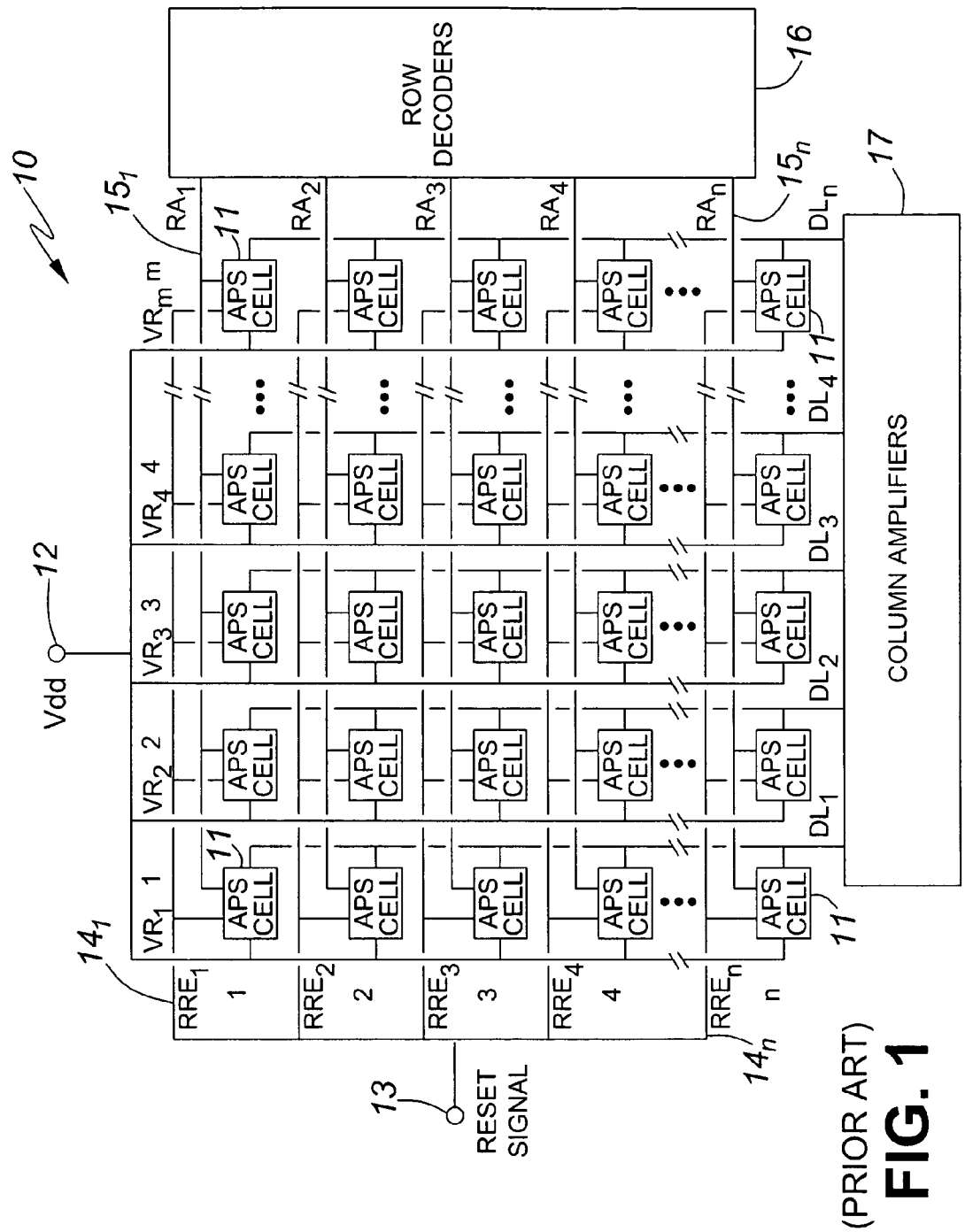
FIG. 1 is a block diagram of a typical image sensor array.

Referring to FIG. 1, there is shown a block diagram of a typical image sensor array 10. The sensor array 10 consists of active pixel sensor (APS) cells 11 arranged in rows 1 to n and columns 1 to m. The columns 1 to m of APS cells 11 are provided a voltage Vdd from a voltage supply 12 through lines $VR_1$ to $VR_m$. In addition, each row 1 to n of APS cells 11 simultaneously receive reset enable signals $RRE_1$ to $RRE_n$ from a reset signal 13 on lines $14_1$ to $14_n$ to reset the sensor circuits 11. Access to each horizontal row 1 to n of APS cells 11 is provided by applying individual access signals $RA_1$ to $RA_n$ which are normally pulses of equal amplitude but spaced in time via row lines $15_1$ to $15_n$ from a row address decoder 16. The columns 1 to m of APS cells 11 are connected via data lines $DL_1$ to $DL_m$ which are coupled to column sense amplifiers 17 to amplify the image signal. Thus the rows 1 to n of cells 11 are simultaneously reset by signals $RRE_1$ to $RRE_n$ for sensing the incident light on the cells 11 whereas the sequential detecting of the level of incident light in the rows 1 to n of cells 11 is initiated by access signals $RA_1$ to $RA_n$ and received on data lines $DL_1$ to $DL_m$.

Figure 2:
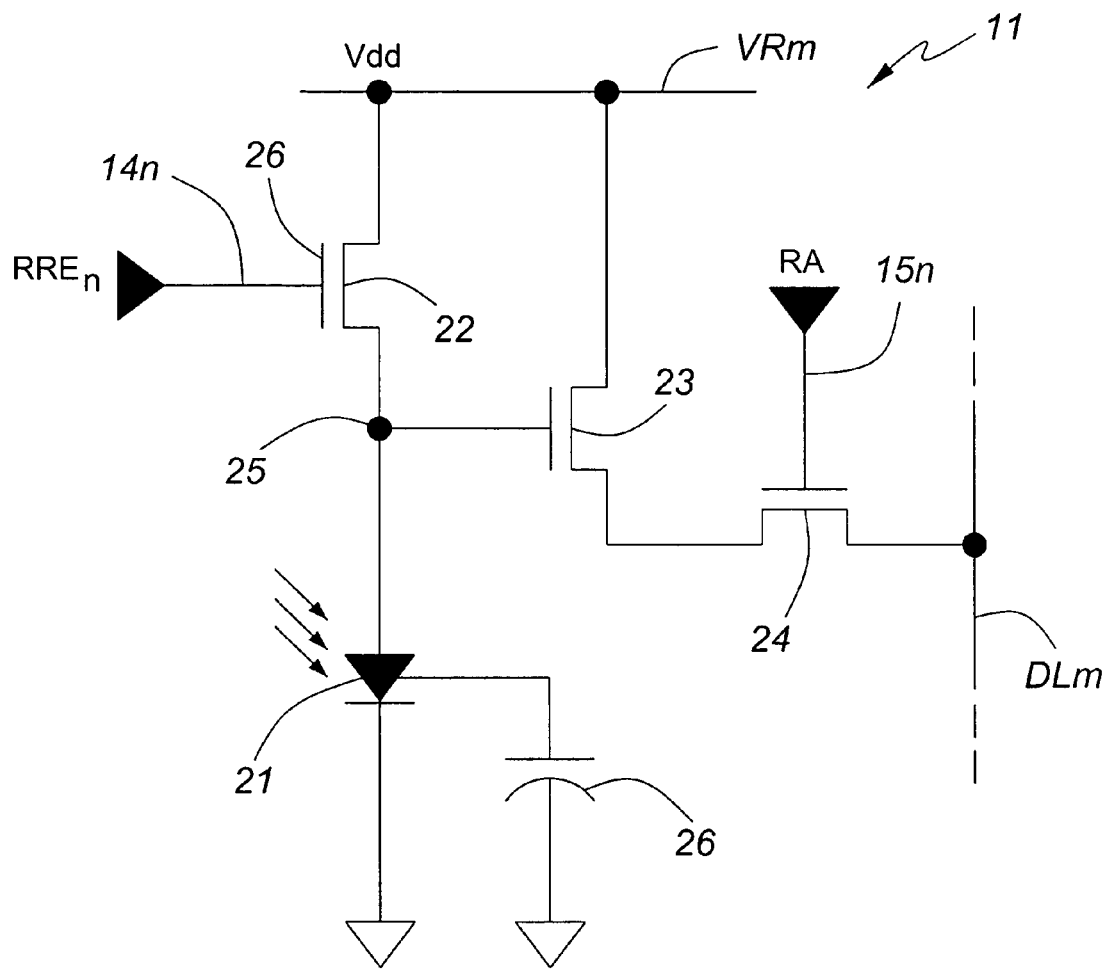
FIG. 2 is a circuit diagram of an active pixel sensor (APS) cell.

A typical three transistor APS cell 11 is illustrated in FIG. 2. The cell 11 consists of a photodiode 21 which is inherently in parallel with a diffusion 26 acting as a capacitor coupled to the source of a reset transistor 22 and the gate of a transistor 23 which acts as a source follower amplifier. The drains of the reset transistor 22 and of the amplifying transistor 23 are normally connected to a supply voltage Vdd through a voltage line $VR_m$, however the reset transistor 22 and the amplifying transistor 23 may be connected to different voltage sources. The amplifying transistor 23 source is coupled to a data line $DL_m$ through an access transistor 24. When activated, the reset transistor 22 places charge on the diffusion 26 from the supply voltage Vdd. This charge is drained through the photodiode 21 at a rate proportional to the intensity of incident light on the photodiode 21. A signal proportional to this intensity can be read from the cell 11 on the dataline $DL_m$ by enabling the access transistor 24.

During normal operation, the voltage Vdd supplied to the drain of the reset transistor 22 is common to every cell 11 (i.e. pixel) in the array 10. Each row 1 to n of cells 11 simultaneously receives a reset enable signal $RRE_1$ to $RRE_n$ respectively via a row reset line $14_1$ to $14_n$. The reset enable signals $RRE_1$ to $RRE_n$ are active when at a logical high and all have the same amplitude which may be substantially at the level of the supply voltage Vdd. Again, during normal operation, the voltage level 13 associated with this logical high is common throughout the array. This means that all diffusions 26 acting as capacitors are reset to the same level, ie the same amount of reset charge is placed on the node of the photodiode 21 for every cell 11.

The common reset voltage Vdd ensures that each cell 11 will respond in a similar manner if illuminated by light of a similar intensity. This is ideal for image capture operations but may cause large currents to be produced in the cell 11 substrates during reset particularly when the charges on the cells 11 have been substantially depleted in the radiation sensing cycle.

Figure 3:
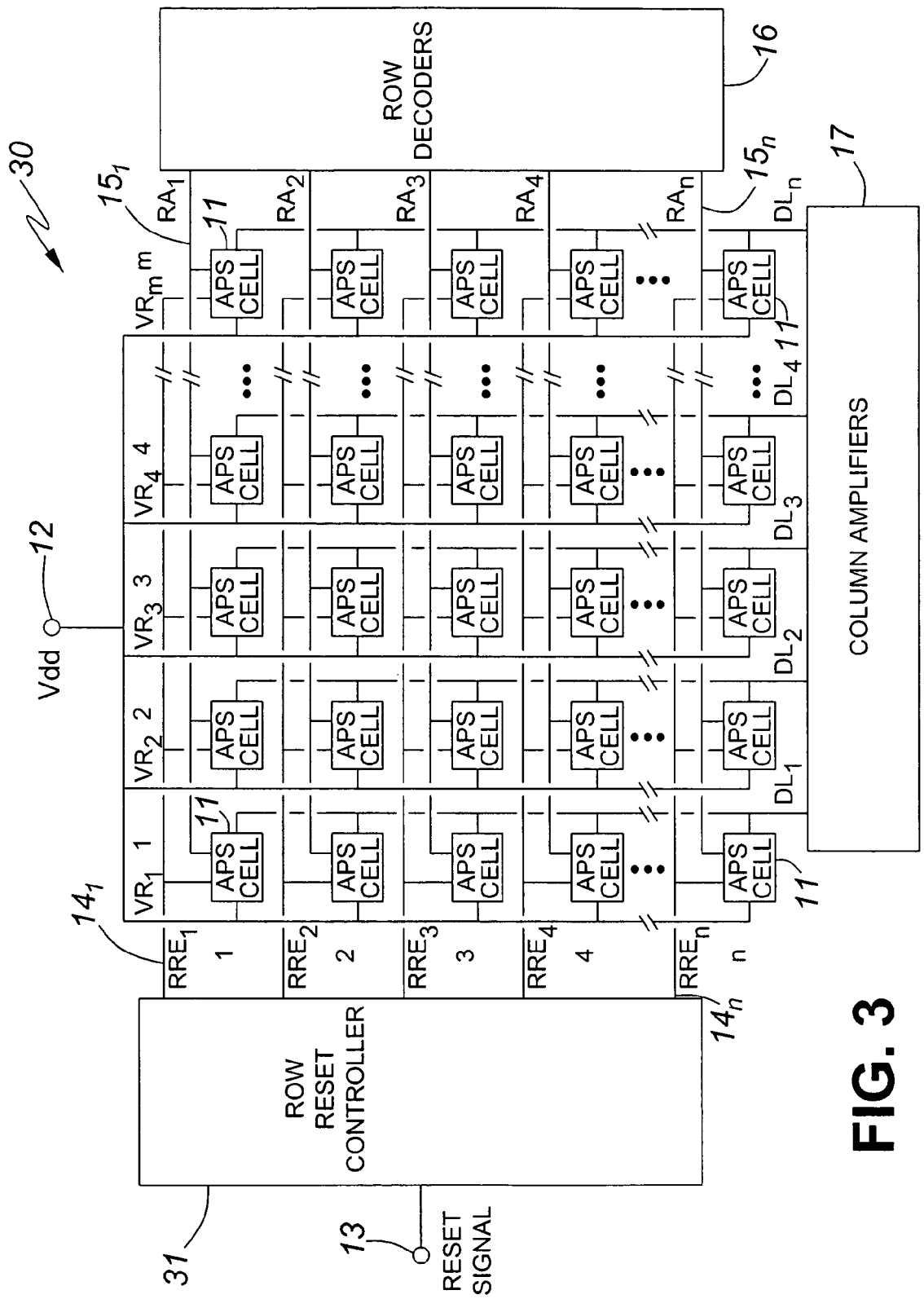
FIG. 3 illustrates a block diagram of the sensor array in accordance with the present invention.

Referring to FIG. 3, there is shown a diagram of the image sensor array 30 in accordance with the present invention. In accordance with this embodiment, the reset enable signals $RRE_1$ to $RRE_n$ which are generated in a row reset controller 31 are applied to lines $14_1$ to $14_n$ to reset the sensor circuits 11. However, rather then generate simultaneous signals $RRE_1$ to $RRE_N$, they are sequentially generated in an appropriate order such that all cells are not reset simultaneously. In this way, only one or more rows are pre-reset at the same time which will generate tolerable currents in the substrate at any one time. Further in accordance with the present invention, once all of the rows have been pre-reset, the row reset controller 31 will generate simultaneous signals $RRE_1$ to $RRE_n$ on the lines $14_1$ to $14_n$ to reset all of the sensor circuits 11 to substantially the same voltage level. In the process, large currents will not be generated since all of the cells 11 will have a charge very nearly at the reset voltage prior to being globally reset. During the pre-reset process, the cells 11 are roughly charged to the same voltage level, however, variations occur mainly due to the integration time between the pre-resetting of individual rows at the different times. During the simultaneous reset process, the voltage supplied to the drain of the reset transistor 22 is common to every cell 11 on the array 30. The gate of each reset transistor 22 is driven by a common reset enable signal $RRE_1$ to $RRE_n$, each row 1 to n of cells 11 receives the same reset enable signal via a row reset line $14_1$ to $14_n$. This means that every cell 11 in the array 30 is reset to the same level or that the same amount of reset charge is placed on a node of the photodiode 21 for every cell 11. This common reset voltage ensures that each cell 11 will respond in a similar manner if illuminated by a light of similar intensity.

The above embodiment provides for the operation of an array 30 in which latch-up is avoided without increasing the cost of manufacturing or the use of space on the chip which would be necessitated with the addition of wells or biasing circuits for the array 30.

The sequence of pre-resetting the cells 11 in an array 30 may take many forms. For instance, individual cells 11 may be pre-reset individually or in groups, and a group of cells 11 need not be made up of adjacent cells 11. In addition, the cells 11 may be pre-reset in groups of one or more rows or one or more columns, and once again, the rows or columns need not be adjacent. Because of the integration of this APS array 30 with peripheral circuitry and other circuits, it is desirable to keep current flow at a fairly steady level, where large variations in current flow may disrupt other functioning circuits.

Figure 4:
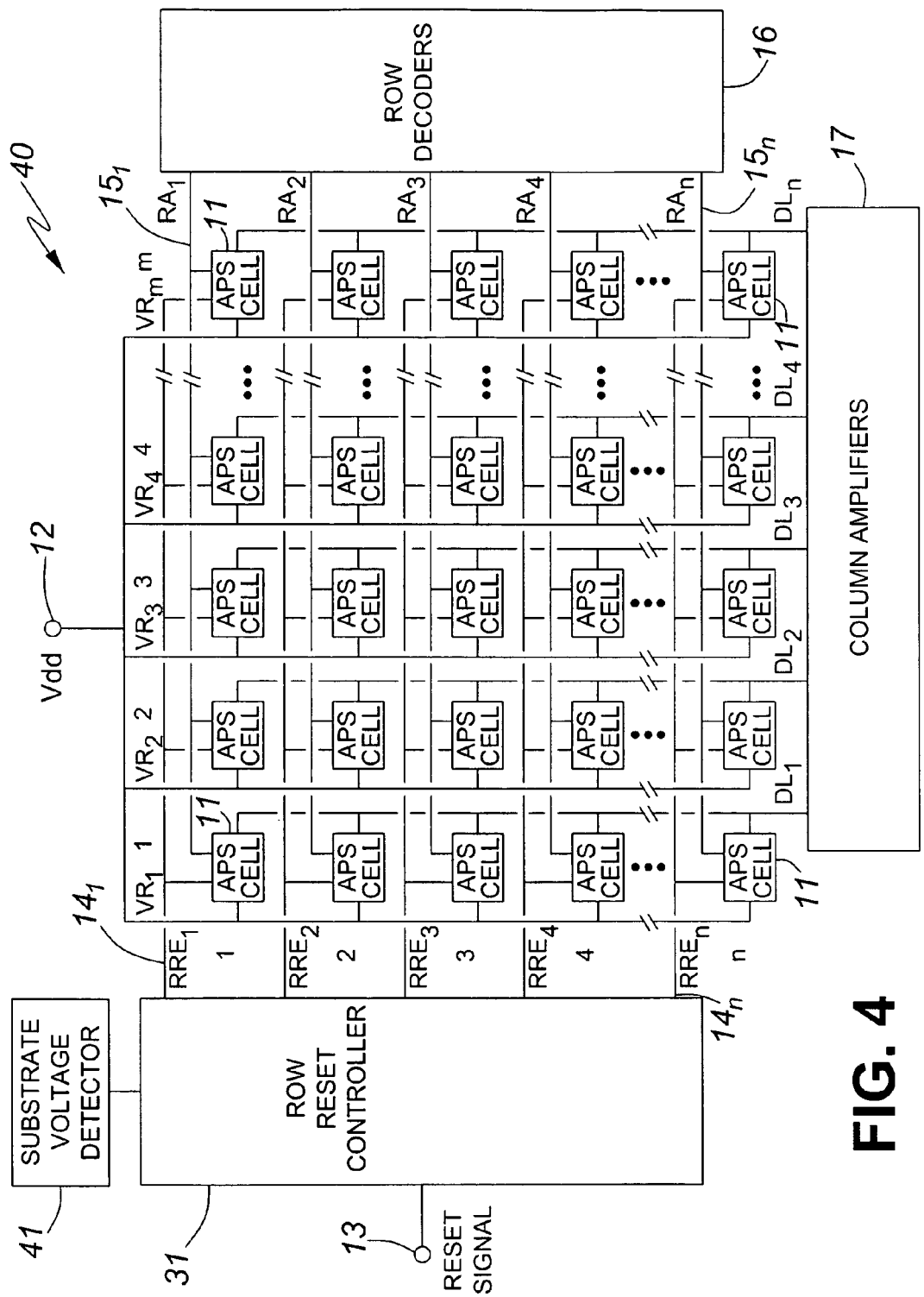
FIG. 4 illustrates a block diagram of the sensor array of a further embodiment of the present invention including bias voltage sensing means.

In a further embodiment of the present invention illustrated in FIG. 4, the array 40 is similar to the embodiment illustrated in FIG. 3 except that it includes a substrate voltage detector 41 which is connected to the row reset controller 31. The substrate voltage detector 41 tests the amount of charge (or voltage level) on the array 40 substrate. If charge levels are low, the row reset controller 31 will pre-reset more than one row at a time in order to reduce the integration time and power used to pre-reset and reset the entire array 40. The substrate voltage detector 41 may be in the form of a sensing circuit which compares the bias voltage level with a common signal such as ground. Such a circuit can determine the additional bias voltage that the array 40 is able to handle. This data can be used by the controller 41 to set the pre-reset/reset cycle of the array 40 so as to pre-reset a maximum number of cells 11 at a time. In addition, the controller 31 may be programmed to pre-reset selected numbers of adjacent or non-adjacent individual cells 11, as well as non-adjacent rows or columns.

The present invention can also be applied to variations of the active pixel sensor array, such as variations in the structure of the active pixel sensor. For example, a 4T or 5T structure can be employed, where a global reset is necessary in order to acquire a proper image.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of resetting an array of active pixel sensors (APS) during a reset cycle wherein the sensors are arranged in rows and columns and formed into predetermined groups each having one or more sensors, wherein the reset cycle comprises the steps of:
    (a) sequentially applying a pre-reset voltage to each of the predetermined groups of one or more sensors in the array by:
        (a.i) detecting the bias voltage level of the sensor array; and
        (a.ii) selecting the number of sensors in the groups as a function of the bias voltage detected; and
    (b) subsequently applying a predetermined reset voltage to all of the sensors in the array substantially simultaneously.

2. A method as claimed in claim 1 wherein each group comprises one or more rows of sensors.

3. A method as claimed in claim 1 wherein each group comprises one or more columns of sensors.

4. Apparatus for resetting an array of active pixel sensors (APS) during a reset cycle wherein the sensors are arranged in rows and columns and formed into predetermined groups each having one or more sensors, comprising:
    (a) a controller coupled to the sensor array for sequentially applying a pre-reset voltage to each of the predetermined groups of one or more sensors in the array;
    (b) a controller coupled to the sensor array for subsequently applying a predetermined reset voltage to all of the sensors in the array substantially simultaneously;
    (c) a detector for detecting the bias voltage of the sensor array; and
    (d) the controller coupled to the voltage detector for determining the number of sensors in each group being pre-reset.

5. Apparatus as claimed in claim 4 wherein each group comprises one or more rows of sensors.

6. Apparatus as claimed in claim 4 wherein each group comprises one or more columns of sensors.

7. A method of resetting an array of active pixel sensors (APS) arranged in rows and columns, comprising the steps of:
    (a) pre-resetting the sensors in the array by sequentially resetting groups of one or more sensors, wherein the pre-resetting step includes:
        (a.i) detecting the bias voltage level of the sensor array; and
        (a.ii) selecting the number of sensors in the pre-resetting groups as a function of the bias voltage detected; and
    (b) resetting all of the sensors at one time.

8. A method as claimed in claim 7 wherein each group comprises one or more rows of sensors.

9. A method as claimed in claim 7 wherein each group comprises one or more columns of sensors.

10. Apparatus for resetting an array of active pixel sensors (APS) arranged in rows and columns, comprising:
    (a) a controller coupled to the sensor array for sequentially pre-resetting groups of one or more sensors in the array, and for simultaneously resetting all of the sensors in the array;
    (b) a detector for detecting the bias voltage of the sensor array; and
    (c) the controller being coupled to the voltage detector for determining the number of sensors in each group being pre-reset.

11. Apparatus as claimed in claim 10 wherein each group comprises one or more rows of sensors.

12. Apparatus as claimed in claim 10 wherein each group comprises one or more columns of sensors.

* * * * *